Aug. 28, 1962 K. TEER 3,051,776

CORRECTION OF HIGH FREQUENCY COMPONENTS OF BRIGHTNESS SIGNAL IN COLOR RECEIVER

Filed June 17, 1957 4 Sheets-Sheet 1

INVENTOR
KEES TEER

BY Frank R. Jufari
AGENT

Aug. 28, 1962 K. TEER 3,051,776
CORRECTION OF HIGH FREQUENCY COMPONENTS OF
BRIGHTNESS SIGNAL IN COLOR RECEIVER
Filed June 17, 1957 4 Sheets-Sheet 2

INVENTOR
KEES TEER
BY Frank R. Jifari
AGENT

INVENTOR
KEES TEER

BY Frank R. Jrifari
AGENT

Aug. 28, 1962 K. TEER 3,051,776

CORRECTION OF HIGH FREQUENCY COMPONENTS OF BRIGHTNESS SIGNAL IN COLOR RECEIVER

Filed June 17, 1957 4 Sheets-Sheet 4

INVENTOR
KEES TEER

BY Frank R. Jifari
AGENT

United States Patent Office 3,051,776

Patented Aug. 28, 1962

3,051,776

CORRECTION OF HIGH FREQUENCY COMPONENTS OF BRIGHTNESS SIGNAL IN COLOR RECEIVER

Kees Teer, Eindhoven, Netherlands, assignor to North American Philips Company Inc., New York, N.Y., a corporation of Delaware Filed June 17, 1957, Ser. No. 666,173
Claims priority, application Netherlands Aug. 13, 1956
11 Claims. (Cl. 178—5.4)

This invention relates to receivers for colour television systems in which a signal of large bandwidth and at the same time at least one signal of small bandwidth are transmitted, that is to say for systems in which the transmitted signals are linear combinations with positive coefficients of signals each relating to only one primary light component of the scene to be reproduced.

An example of such systems is a system in which a brightness signal of large bandwidth is transmitted and two other signals each relating to only one primary light component of the scene to be reproduced, are transmitted with small bandwidth.

Another example is a system in which two signals of small bandwidth each relating to only one primary light component of the scene to be reproduced, are transmitted alternately and a signal of large bandwidth is transmitted, the low frequencies of which relate to a primary light component of the scene to be reproduced which differs from those of the two signals of small bandwidth and the high frequencies of which relate to the brightness of the scene to be reproduced.

The signals of small bandwidth are usually transmitted by means of auxiliary carrier waves which may be located in the frequency range occupied by the signal of large bandwidth. In the first-mentioned system, for example, each signal of small bandwidth is modulated on a separate auxiliary carrier wave. In the second system, the two signals of small bandwidth are modulated alternately, for example, on the same auxiliary carrier wave.

The operation of known receivers for such systems is as follows. The incoming signal is restored, if necessary, to its low-frequency position and, subsequently, the signal of large bandwidth is separated by means of filters from the modulated auxiliary carrier waves, the latter subsequently being demodulated. If two auxiliary carrier waves are present, each having modulated on it a signal of small bandwidth, then after demodulation of the auxiliary carrier waves three signals are available, one of large bandwidth and two of small bandwidth. If only one auxiliary carrier wave is present, on which two different signals of small bandwidth are modulated alternately, the demodulated signal is supplied to a switch by which the two signals are supplied alternately to two separate channels. In this case also, three signals are ultimately available, as before one of large bandwidth and two of small bandwidth.

In either case, that part of the signal of large bandwidth which comprises frequencies higher than those of the signals of small bandwidth, is added to the two signals of small bandwidth and, if desired after combination of the whole signal of large bandwidth and the two signals thus obtained, the three resulting signals are supplied to the reproducing device of the receiver.

In practice, it has been found that the addition of said high frequencies of the signal of large bandwidth to the signals of small bandwidth, unless this is effected by means of filter networks which are calculated and designed very accurately and hence are expensive, leads to transition phenomena in the frequency bands of the relevant video signals, by which the quality of the image during reproduction is influenced unfavourably and under certain conditions even in a highly interfering manner.

The present invention mitigates this disadvantage without having recourse to said filter networks which are to be calculated and designed with great accuracy.

The receiver according to the invention for this purpose is characterized in that the video-frequency signal of large bandwidth and the video-frequency signal of small bandwidth are supplied with opposite polarities to a common low-pass filter, the pass range of which is at most equal to the bandwidth of the relevant signal of small bandwidth, and that the output signal of this filter is combined with said signal of large bandwidth.

In order that the invention may be readily carried into effect, several embodiments will now be described more fully, by way of example, with reference to the accompanying drawings, in which.

Figure 1:
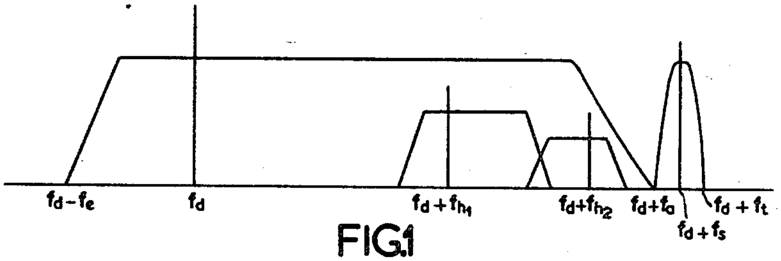
FIGS. 1 and 7 show frequency spectra of television signals in the transmission path with the use of systems to which the invention is applicable.
Figure 2:
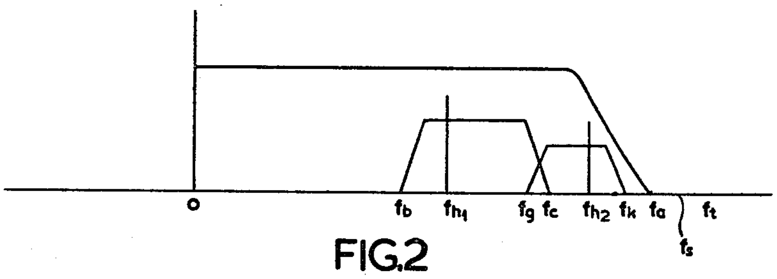
FIGS. 2 and 8 show frequency spectra of similar signals at the transmitting and the receiving end.

FIG. 1 shows an example of a frequency spectrum occurring in a colour television system, to the receiver of which the invention is applicable. Such a frequency spectrum, which extends from a frequency $f_d - f_e$ to a frequency $f_d + f_a$, is obtained when a carrier wave of frequency $f_d$ has modulated on it three signals, the first of which extends over a frequency band from 0 to $f_a$, the second of which extends from $f_b$ to $f_c$ and the third of which extends from $f_g$ to $f_k$, as shown in FIG. 2, and when the lower side-band is partially suppressed. The signal of large bandwidth is, for example, the brightness signal. The second signal between the frequencies $f_b$ and $f_c$ is obtained by modulating one of the colour signals, for example the signal relating to the red light components of the scene to be reproduced, on an auxiliary carrier wave of frequency $f_{h1}$. The third signal between the frequencies $f_g$ and $f_k$ is obtained by modulating the other colour signal relating, for example, to the blue light components of the scene to be reproduced, on an auxiliary carrier wave of frequency $f_{h2}$. The auxiliary carrier waves naturally have frequencies such and may exhibit phase jumps such that the interference between the various signals during reproduction is imperceptible at least visually.

Such a frequency spectrum is naturally also obtained by modulating the signal of large bandwidth on a carrier wave of frequency $f_d$ and modulating a colour signal on each of two carrier waves of frequencies $f_d + f_{h1}$ and $f_d + f_{h2}$. However, after demodulation in the receiver, the carrier waves $f_d + f_{h1}$ and $f_d + f_{h2}$ still appear again in the video-frequency spectrum of the signal of large bandwidth as carrier waves of frequencies $f_{h1}$ and $f_{h2}$.

The transmitted signal usually contains another auxiliary carrier wave on which the sound signal is modulated. In FIGS. 1 and 2, the frequency of this sound carrier wave is indicated by $f_s$. It is also assumed that the modulated sound carrier wave extends from $f_a$ to $f_t$.

Figure 3:
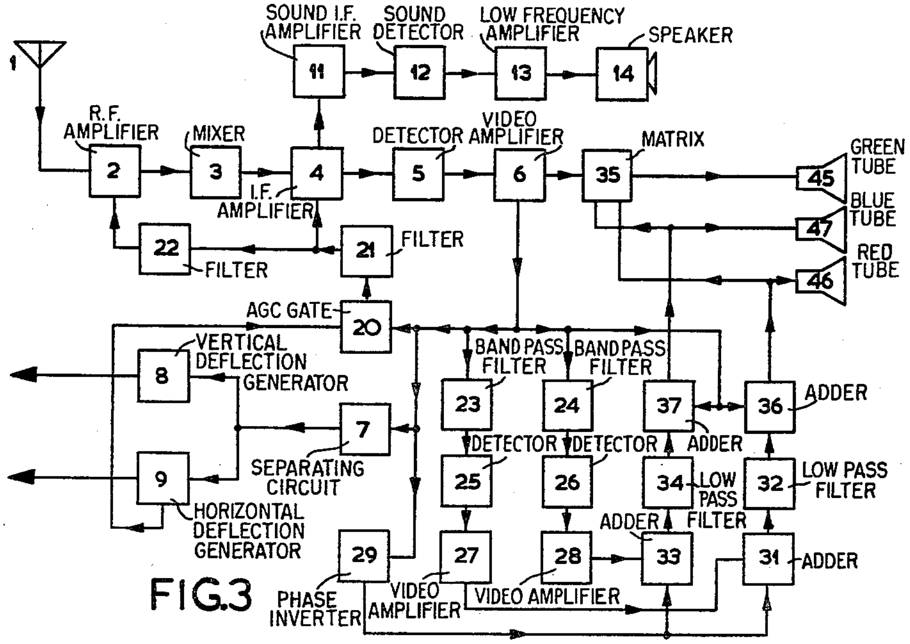
FIGS. 3, 6, 9 and 11 show diagrammatic embodiments of receivers according to the invention.

FIG. 3 shows one embodiment of a receiver according to the invention suitable for the reception of a signal having a frequency spectrum as shown in FIG. 1. Reference numeral 1 indicates an aerial system which is coupled to a high-frequency amplifier 2 and a mixing stage 3. The output signal of 3 is supplied to an intermediate-frequency amplifier 4, which is coupled to a detector 5 and a video-amplifier 6.

The carrier wave on which the sound signal is modulated may be separated from the television signal either in intermediate-frequency stage 4 or in detector 5, dependent upon whether use is made of the intercarrier sound principle or not, and may be supplied to an intermediate-frequency stage 11 which in turn is coupled to a sound detector 12. The output signal of 12 is supplied through a low-frequency amplifier 13 to one or more loudspeakers 14. In FIG. 3, the sound carrier wave is separated from the television signal in the intermediate-frequency stage 4.

In the case under consideration, the output signal of the video-amplifier 6 has a frequency spectrum as shown in FIG. 2, that is to say the modulated sound carrier wave is no longer present in this output signal.

The synchronizing signals comprised in the output signal of video-amplifier 6 are again obtained from this output signal in a separating circuit 7.

The synchronizing pulses for vertical deflection are supplied to a device 8 for synchronizing the sawtooth generator which forms part thereof. The output currents of 8 are supplied to the vertical deflection coils (not shown) of the various picture tubes.

The synchronizing pulses for horizontal deflection are supplied to a device 9 for synchronizing the sawtooth generator which forms part thereof. The output currents of 9 are supplied to the horizontal deflection coils (not shown) of the picture tubes.

The devices 8 and 9 also comprise flywheel circuits, if required, whilst the device 9 may also provide in known manner, from the fly-back of the line sawtooth generator, a direct voltage which may serve as a high tension for the picture tubes.

For the volume control, the fly-back pulses provided by the device 9 may be supplied, for example in known manner, to a device 20 having also supplied to it the output signal of video-amplifier 6. The device 20 comprises a gating circuit which under the action of said fly-back pulses becomes conducting only during the occurrence of the line and picture synchronizing pulses. The pulses appearing at the output of the gating circuit, the amplitudes of which are proportional to the corresponding peak values of the synchronizing pulses, are a measure of the level of the signal occurring at the output of video-amplifier 6. The resulting pulses may be supplied as control voltages via smoothing networks 21 and 22 to the high- and intermediate-frequency stages.

The output signal of amplifier 6 is likewise supplied to a band-pass filter 23 having a pass range between the frequencies $f_b$ and $f_c$ and to a band-pass filter 24 having a pass range between the frequencies $f_g$ and $f_k$. The output signals of 23 and 24 are supplied to detectors 25 and 26 respectively, at the outputs of which signals thus occur which exhibit frequency spectra as shown in full lines in FIGS. 4 and 5.

The devices 25 and 26 in turn are connected to video-amplifiers 27 and 28.

Figure 4:
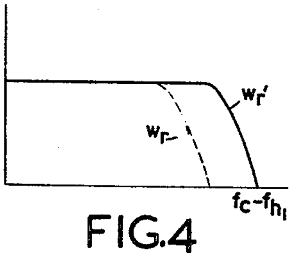
FIGS. 4, 5 and 10 show frequency spectra of the signals of small bandwidth such as occur in receivers according to the invention.

According to the invention, both the output signal of video-amplifier 27 and the output signal of a phase-inverting device 29, to which the output signal of video-amplifier 6 is supplied, are supplied via an adding device 31 to a low-pass filter 32, the pass range of which is at most equal to the bandwidth of the relevant signal of small bandwidth and the characteristic curve of which is shown in dashed line in FIG. 4. Similarly, both the output signal of video-amplifier 28 and the output signal of a phase-inverting device 29 are supplied via an adding device 33 to a low-pass filter 34, the pass range of which is likewise at most equal to the bandwidth of the relevant signal of small bandwidth and the characteristic curve of which is likewise shown in dashed line in FIG. 5.

The output signal of video-amplifier 6 and the output signal of low-pass filter 32 are combined in an adding device 36, the output signal of video-amplifier 6 and the output signal of low-pass filter 34 being combined in an adding device 37.

The output signals of video-amplifier 6 and of the adding devices 36 and 37 are also supplied to a device 35 which comprises suitably chosen combination networks known per se, which serve to obtain a signal from the brightness signal and the two signals each relating to a given primary light component of the scene to be reproduced, in the present example the red and blue light components respectively, which signal is likewise of large bandwidth and relates to a primary light component differing from those of the two transmitted signals of small bandwidth, that is to say the green light component.

The output signals of the devices 35, 36 and 37 can now be supplied to the control elements of picture tubes 45, 46 and 47 which reproduce these signals in green light, red light and blue light, respectively. As a matter of fact, these signals may alternatively be supplied to the control elements of a single three-colour picture tube comprising three electron guns. If use is made of a three-colour picture tube having one electron gun, the signals must be supplied to the control element thereof in a given sequence of time.

The following remarks may serve to elucidate the foregoing further. If the signals relating to the green, red and blue light components of the scene to be reproduced, which signals are produced by the television camera at the transmitting end, are indicated by G, R and B, respectively, the brightness signal, which will be indicated hereinafter by M, may be substituted by:

$$M=0.30R+0.59G+0.11B$$

The constants occurring in the formula are so chosen that their sum is equal to unity and their relationship is such that M substantially corresponds to a signal supplied by a black and white camera.

Now, the signal M occurs at the output of video-amplifier 6, the signal $W'_rR$ at the output of amplifier 27 and the signal $W'_bB$ at the output of amplifier 28. $W'_r$ and $W'_b$ represent therein the transmission functions for the signals R and B, respectively. These transmission functions $W'_r$ and $W'_b$ lead to signals, the frequency spectra of which are shown in full lines in FIGS. 4 and 5.

The signals $W'_rR$ and $W'_bB$ sould now be supplemented with those frequencies of the brightness signal which are located outside the frequency bands occupied by these signals. This supplement must be such that in the reproduction of a black-and-white scene the reproduced signal relating to red and also the reproduced signals relating to green and blue fully correspond to the brightness signal, since with a black-and-white reproduction M, R, G and B are identical. This implies that a signal $(W-W'_r)M$ must be added to $W'_rR$ and a signal $(W-W'_b)M$ must be added to $W'_bB$ to obtain signals:

$$W'_rR+(W-W'_r)M$$

and $$W'_bB+(W-W'_b)M$$

wherein W indicates a transmission function leaving the signal M, apart from any desired introduction of a delay, completely undisturbed.

Each of the two above-mentioned signals becomes equal to WM, if $M=R=G=B$.

In receivers of known type it is actually endeavored to form the signals $(W-W'_r)M$ and $(W-W'_b)M$. However, if the transmission functions of the filters required are not completely equal to $(W-W'_r)$ and $(W-W'_b)$, colour errors during reproduction result in those parts of the image in which during reproduction components occur having their frequencies located in those regions in which the various frequency bands adjoin. In the reproduction of a colour scene, these colour errors, although perceptible, are usually tolerable, but especially in the reproduction of a black-and-white scene or black-and-white parts of a colour scene they wrongly appear as colour portions and this is highly undesirable.

According to the invention, both the phase-inverted signal and the colour signal are supplied to filters 32 and 34, respectively, the pass ranges of which are at most equal to the bandwidth of the relevant signal of small bandwidth. If the transmission functions of these filters are indicated by $W_r$ and $W_b$, respectively, their output signals are:

$$W_r(R-M)$$

and $$W_b(B-M)$$

Figure 5:
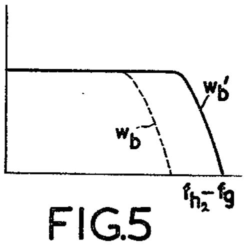

The transmission functions $W_r$ and $W_b$ lead to signals the frequency spectra of which are shown in dashed lines in FIGS. 4 and 5. The fact that $W_r$ and $W_b$ characterize a pass range smaller than $W'_r$ and $W'_b$ serves to avoid that the transmission functions for R and B would be different from that for M. The transmission functions $W_r$ and $W_b$ may be comparatively arbitrary, provided the above-mentioned conditions are fulfilled.

Subsequently, $W_r(R-M)$ and $W_b(B-M)$ are combined with WM in the adding devices 36 and 37. At the output of adding device 36 thus appears a signal:

$$W_r(R-M)+WM=$$
$$W_rR+(W-W_r)M$$

and at the output of adding device 37 thus appears a signal:

$$W_b(B-M)+WM=$$
$$W_bB+(W-W_b)M$$

Apart from the difference unimportant in this connection between $W'_r$ and $W_r$ and $W'_b$ and $W_b$, respectively, these signals are identical with the desired signals previously mentioned, but without use being made of filters having transmission functions which are complementary to the transmission functions of the colour signals.

The signal to be supplied to picture tube 45 is obtained in the usual manner from WM, $W_rR+(W-W_r)M$ and $W_bB+(W-W_b)M$. In device 35, to which these three signals thus are supplied, the output signal of 36 with respect to WM is attenuated to $0.30[W_rR+(W-W_r)M]$ and the output signal of 37 is attenuated to $$0.11[W_bB+(W-W_b)M]$$

the resultant signals being combined with WM in the negative sense. This combination yields a signal:

$$0.59W_bG+(W_r-W_b)(0.89M-0.30R)+0.59(W-W_r)M$$

and after being amplified to the same level as the output signals of the adding devices 36 and 37 there results a signal:

$$W_bG+(W_r-W_b)\left(\frac{89}{59}M-\frac{30}{59}R\right)+(W-W_r)M$$

This formula shows that this signal, if relating to a black-and-white scene to be reproduced, is also identical with the brightness signal. In fact, considering that in this case also there applies $M=G=R=B$, the above-mentioned expression becomes equal to WM.

In the foregoing, any phase shifts between the various signals have not been taken into account. Such phase shifts may be compensated in known manner, for example, by means of delay lines.

It can be shown that the above-mentioned expression may alternatively be written as follows:

$$WM-\frac{30}{59}W_r(R-M)-\frac{11}{59}W_b(B-M)$$

From this it follows that the signal of large bandwidth which relates to the green light components of a scene to be reproduced may alternatively be obtained from the output signals of video-amplifier 6 and the low-pass filters 32 and 34.

Figure 6:
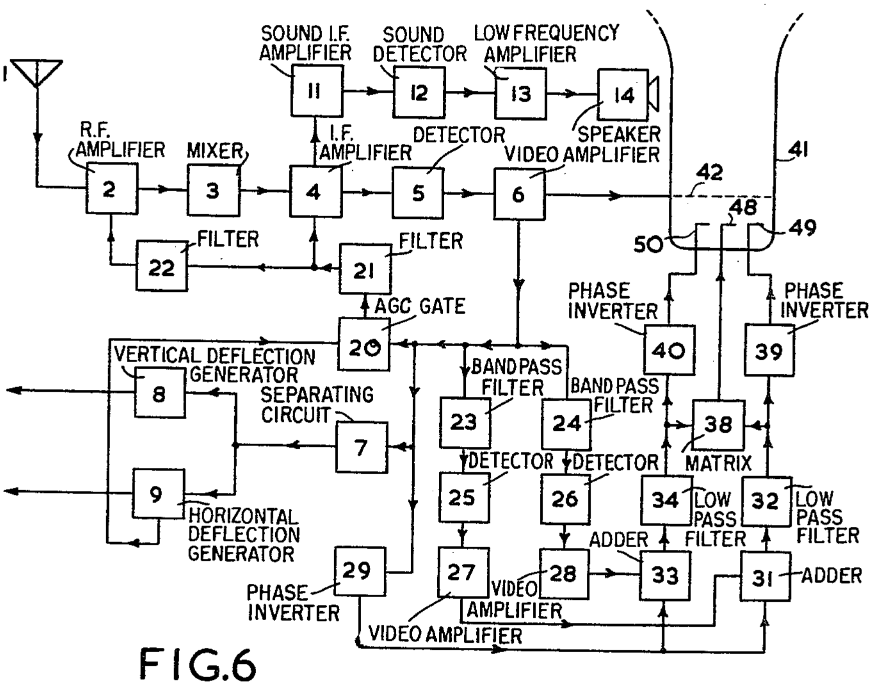

FIG. 6 shows a receiver according to the invention, which makes use of this method for obtaining the signal of large bandwidth which relates to the green light components of a scene to be reproduced. Similar parts of FIGS. 3 and 6 are indicated correspondingly.

The output signals of the low-pass filters 32 and 34 are supplied to a device 38, in which the output signal of 32 is attenuated (with respect to WM) to $$\frac{30}{59}W_r(R-M)$$

and the output signal of 34 is attenuated to $$\frac{11}{59}W_b(B-M)$$

the resultant signals being combined in the positive sense.

In the embodiment shown in FIG. 6, use is made of a three-colour picture tube 41 having three electron guns. The three-colour picture tube in this case also serves as a device for combining each of the signals $W_r(R-M)$, $W_b(B-M)$ and $$-\frac{30}{59}W_r(R-M)-\frac{11}{59}W_b(B-M)$$

with the brightness signal WM. The brightness signal which occurs at the output of video-amplifier 6 is supplied for this purpose to a control grid 42 which is common to all three electron guns of the three-colour picture tube 41. The output signal of device 38 is supplied to the cathode 48 of the electron gun exciting the green-luminescent phosphor of the colour tube, the output signal of low-pass filter 32 is supplied via the phase-inverting device 39 to the cathode 49 of the electron gun exciting the red-luminescent phosphor of the colour tube and the output signal of low-pass filter 34 is supplied via the phase-inverting device 40 to the cathode 50 of the electron gun exciting the blue-luminescent phosphor of the colour tube. The use of these phase-inverting devices is based on the fact that the influence which a signal supplied to a cathode of an electron gun exerts upon the electron beam produced thereby is just opposite to the influence of a signal supplied to a control grid of the electron gun concerned.

Figure 7:
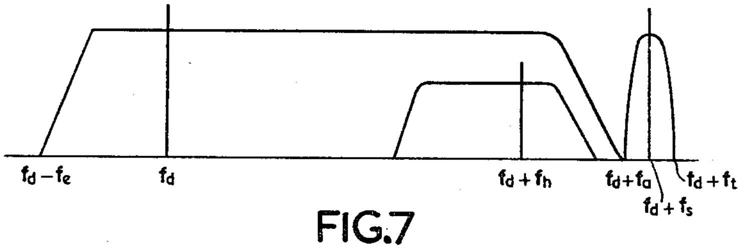
Figure 8:
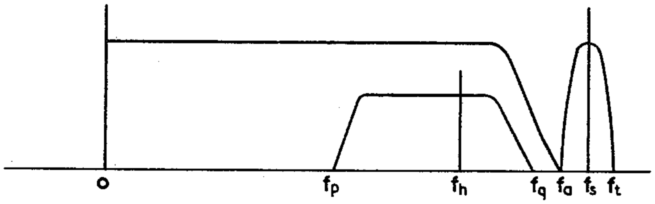

FIG. 7 shows another example of a frequency spectrum which occurs in a colour television system, to the receiver of which the invention is applicable. This frequency spectrum, which extends from a frequency $f_d-f_e$ to a frequency $f_d+f_a$, is obtained when two signals extending over frequency bands of from 0 to $f_a$ and from $f_p$ to $f_q$, respectively, are modulated on a carrier wave of frequency $f_d$ as shown in FIG. 8, and when the lower side-band is partially suppressed. The signal of large bandwidth is now a signal the low frequencies of which relate to the green light components of the scene to be reproduced and the high frequencies of which relate to the brightness of the scene to be reproduced. The second signal between the frequencies $f_p$ and $f_q$ is obtained by modulating alternately two colour signal relating to the red and blue light components, respectively, of the scene to be reproduced on a carrier wave of frequency $f_h$ (for example in the rhythm of the line frequency). In this case also, the auxiliary carrier wave has a frequency such and may exhibit phase jumps such that the interference between the various signals during reproduction are almost imperceptible at least visually.

It is to be noted that in many cases the brightness of the scene to be reproduced may be represented by the green light components of the scene to be reproduced. The whole of the signal of large bandwidth then relates to the green light components of the scene.

The transmitted signal also comprises another auxiliary carrier wave on which the sound signal is modulated. In FIGS. 7 and 8, the frequency of this sound carrier wave is also indicated by $f_s$ and it is also assumed that the modulated sound carrier wave extends from $f_a$ to $f_t$.

Figure 9:
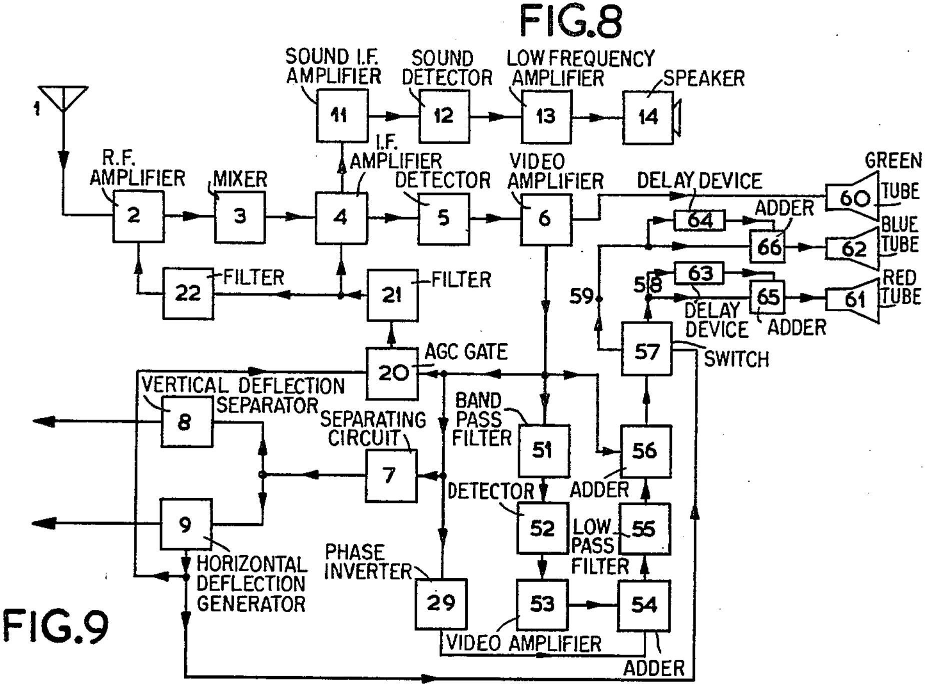

FIG. 9 shows an embodiment of a receiver according to the invention suitable for the reception of a signal having a frequency spectrum as shown in FIG. 7. Identical elements of the embodiments of FIG. 9 on the one hand and FIGS. 3 and 6 on the other are indicated by the same reference numerals. Only those parts of the receiver of FIG. 9 which differ from the parts of the receivers of FIGS. 3 and 6 will be discussed further.

Figure 10:
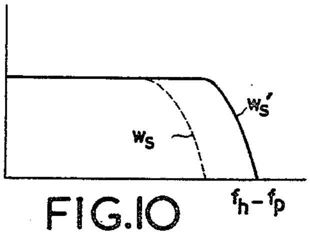

In the case under consideration, the output signal of video-amplifier 6 has a frequency spectrum as shown in FIG. 8, that is to say the modulated sound carrier-wave is no longer present in this output signal. The output signal of 6 is supplied to a band-pass filter 51 having a pass range between the frequencies $f_p$ and $f_g$. The output signal of 51 is supplied to a detector 52, at the output of which a signal occurs having a frequency spectrum as shown in FIG. 10. Detector 52 in turn is connected to a video-amplifier 53.

Again in accordance with the invention, both the output signal of video-amplifier 53 and the output signal of the phase-inverting device 29, to which the output signal of video-amplifier 6 is supplied, are supplied via an adding device 54 to a low-pass filter 55 having a pass range at most equal to the bandwidth of the signal of small bandwidth and having a characteristic curve as shown in dashed line in FIG. 10.

The output signal of video-amplifier 6 and the output signal of low-pass filter 55 are combined in an adding device 56. The output signal thereof is supplied to a switch 57 having two outputs 58 and 59 and which, in the example chosen, is switched in the rhythm of the line frequency. For this purpose, the switch 57 is controlled by fly-back pulses provided, for example, by the device 9.

The output signal of device 6 and the signals occurring at the output terminals 58 and 59 of switch 57 can now be supplied respectively to the control elements of picture tubes 60, 61 and 62, which reproduce these signals in green light, red light and blue light, respectively.

The output signals which occur at the terminals 58 and 59 may alternatively by supplied to the control elements of the picture tubes 61 and 62 via suitably chosen retarding devices 63 and 64 and adding devices 65 and 66, in the latter of which the non-delayed signals are combined with the corresponding delayed signals, resulting in semi-continuous signals occurring at these control elements. As before, it is possible for these signals to be supplied to the control elements of a single three-colour picture tube having three electron guns. If use is made of a three-colour picture tube having one electron gun, the signals are to be supplied to the control element thereof in a given sequence of time.

The signal which occurs at the output of video-amplifier 6 may in this case be written as follows:

$$W_gG+(W-W_g)M$$

wherein $W_g$ indicates the transmission function for the low-frequencies in this signal relating to the green light components of the scene to be reproduced (see FIG. 10) and $(W-W_g)M$ indicates the transmission function of the high frequencies in this signal relating to the brightness of the scene to be reproduced.

At the output of amplifier 53 there occurs the signal $W'_sS$, wherein S indicates alternately the red and the blue colour signal and wherein $W'_s$ indicates the transmission function for the signal S. The latter transmission function leads to a signal having a frequency spectrum as shown in full line in FIG. 10.

Both the phase-inverted output signal of video-amplifier 6 and the output signal of video-amplifier 53 are supplied to the filter 55 having a pass range at most equal to the bandwidth of the signal of small bandwidth. If the transmission function of this filter is indicated by $W_s$, the output signal thereof is:

$$W_sS-W_gG-(W_s-W_g)M$$

or $$W_s(S-G)$$

according as the frequency range occupied by $W_sS$ is larger or smaller than in the frequency range occupied by $W_gG$.

The output signal of low-pass filter 55 and the output signal of video amplifier 6 are now combined in adding device 56. At the output of 56 there now appears a signal:

$$W_sS+(W-W_s)M$$

or $$W_sS+(W_g-W_s)G+(W-W_g)M$$

From these formulas it again appears that in either case the signal, if it relates to a black-and-white scene to be reproduced or parts thereof, is identical with the brightness signal, considering again that there applies:

$$M=G=R=B$$

Comparison of the two above-mentioned expressions shows that the bandwidth of signal S is preferably larger than the bandwidth of that part of the signal of large bandwidth which relates to the green light component of the scene to be reproduced, since in this case the signal S is supplemented only with components relating to the brightness of the scene to be reproduced and not supplemented with components relating to the green light components of the scene to be reproduced.

In the embodiment shown in FIG. 9, the high frequencies of the signal of large bandwidth, which relate to the brightness of the scene to be reproduced, are added to the non-divided output signal of video-amplifier 53. It is not until these high frequencies have been added to said output signal that the two signals, each relating to a primary light component of the scene to be reproduced, are separated from one another and each supplied to a picture tube, if desired together with the corresponding delayed signals.

Figure 11:
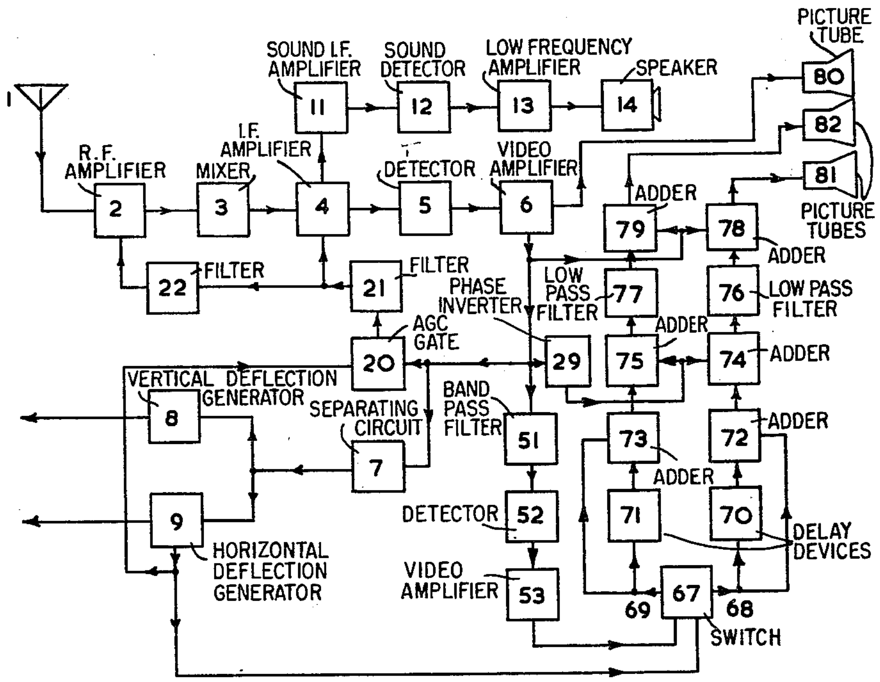

FIG. 11 shows an embodiment in which the output signal of video-amplifier 53 is immediately divided and each of the resultant signals combined with the corresponding delayed signal. The high frequencies of the signal of large bandwith are added to the two semi-continuous signals thus obtained.

Identical parts of FIGS. 9 and 11 are indicated by the same reference numerals. The output signal of video-amplifier 53 is supplied to a switch 67 having two outputs 68 and 69 and which, in the example chosen, is switched in the rhythm of the line frequency. For this purpose, the switch 67 is controlled by fly-back pulses provided, for example, by the device 9.

The output signal of switch 67 which occurs at the terminal 68 is supplied on the one hand directly and on the other hand via a retarding network 70 to an adding device 72. Thus, a semi-continuous signal of small bandwidth occurs at the output of 72. Similarly, the signal which occurs at the terminal 69 is supplied directly and through a retarding network 71 to an adding device 73.

The output signals of the adding devices 72 and 73 are supplied to adding devices 74 and 75, respectively, which have also supplied to them the output signal of the phase-inverting device 29. The devices 74 and 75 are connected to low-pass filters 76 and 77, respectively, having pass ranges at most equal to the bandwidth of the signal which occurs at the output of video-amplifier 53.

The output signals of the filters 76 and 77 are combined with the output signal of video-amplifier 6 in adding devices 78 and 79, respectively. The output signals of the devices 6, 78 and 79 at last are supplied to the control elements of picture tubes 80, 81 and 82.

The receiver shown in FIG. 11 has the advantage that the components of high frequencies which are important for the definition of the picture reproduced invariably have the correct value, in contrast to the receiver shown in FIG. 9, which is, however, simpler of construction.

The invention is naturally not limited to the embodiments shown in the figures. Thus, the systems considered in the foregoing always were of the kind in which the auxiliary carrier-waves are located in the frequency range of the signal of large bandwidth. It will be evident that the invention is also applicable to systems in which the signals of small bandwidth are transmitted in frequency ranges which are not occupied by the signal of large bandwidth.

What is claimed is:

1. A circuit for deriving image signals in a color television receiver adapted to receive color signals of the type including a relatively large bandwidth signal M of the form: $M=K_1A+K_2B+K_3C$, wherein $K_1$, $K_2$ and $K_3$ are constants and A, B and C are individual color signals, and a relatively small bandwidth individual color signal A, said circuit comprising means connected to invert the phase of said M signal, means connected to add said A signal and said inverted M signal to provide a signal of the form $A-M$, low-pass filter means having a bandpass range smaller than the bandwidth of said A signal, means applying said $A-M$ signal to said low-pass filter means to provide a signal of the form $W_A(A-M)$ wherein $W_A$ is the transmission function of said low-pass filter, means adding said M signal to said $W_A(A-M)$ signal to provide a signal of the form $W_AA+(W-W_A)M$, wherein W is the transmission function of signal M, reproducing means, and means applying said $W_AA+(W-W_A)M$ signal to said reproducing means.

2. A circuit for deriving image signals in a color television receiver adapted to receive color television signals having a first signal of relatively large bandwidth and a second signal of relatively small bandwidth, comprising means connected to demodulate said first signal to provide third and fourth signals having inverted phases, means connected to demodulate said second signal to provide a fifth signal, a first adding means connected to add said third and fifth signals, a low-pass filter having a frequency pass range for passing only the frequency range of said fifth signal, means connected to apply the added signals to said low-pass filter, and a second adding means connected to add the output of said low-pass filter and fourth signal.

3. A circuit for deriving an image signal in a color television receiver adapted to receive a color television signal having a first video signal of relatively large bandwidth, a subcarrier wave, and a second video signal of relatively small bandwidth modulated on said carrier wave, said circuit comprising a source of said first video signal and a source of said second video signal, first adding means connected to add said first and second video signals, low-pass filter means having a frequency-pass range for passing only the frequency range of said second video signal, means connected to apply the added signals to said filter means, second adding means connected to add the output signal of said filter means and said first video signal, and phase-inverting means connected to invert the phase of said video signal before it is added in said first adding means.

4. The circuit of claim 3 in which said second adding means comprises a cathode-ray tube having two control electrodes, means for applying said first video signal to one of said control electrodes, and means for applying the output signal of said filter means to the other of said control electrodes.

5. A circuit for deriving an image signal in a color television receiver adapted to receive color television signals containing image information in the form of a brightness video signal of relatively large bandwidth and a color video signal of relatively small bandwidth, said circuit comprising a source of said brightness and color video signals, first adding means connected to add said brightness and color video signals, low-pass filter means having a frequency-pass range for passing only the frequency range of said color video signal, means connected to apply the added signals to said low-pass filter means, second adding means connected to add the output signal of said low-pass filter means with said brightness video signal, and phase-inverting means connected to invert the phase of said brightness video signal before it is added in said first adding means.

6. A circuit for deriving image signals in a color television receiver adapted to receive color television signals containing image information in the form of a brightness video signal of relatively large bandwidth and first and second color video signals of relatively small bandwidth, said circuit comprising a source of said brightness and first and second color video signals, first adding means connected to add said brightness signal and said first color signal, first low-pass filter means having a frequency-pass range for passing only the frequency range of said first color signal, means connected to apply the added signals to said first low-pass filter means, second adding means connected to add the output signal of said first low-pass filter means with said brightness signal, third adding means connected to add said brightness signal and said second color signal, second low-pass filter means having a frequency-pass range for passing only the frequency range of said second color signal, means connected to apply the output signal of said third adding means to said second low-pass filter means, fourth adding means connected to add the output signal of said second low-pass filter means and said brightness signal, phase-inverting means connected to invert the phase of said brightness signal before it is added in said first and third adding means, and fifth adding means connected to add said brightness signal and the output signals of said second and fourth adding means thereby to produce a third color signal.

7. A circuit for deriving image signals in a color television receiver adapted to receive color television signals containing image information in the form of a brightness video signal of relatively large bandwidth and first and second color video signals of relatively small bandwidth, said circuit comprising a source of said brightness and first and second color video signals, first adding means connected to add said brightness signal and said first color signal, first low-pass filter means having a frequency-pass range for passing only the frequency range of said first color signal, means connected to apply the added signals to said first low-pass filter means, second adding means connected to add said brightness signal and said second color signal, a second low-pass filter having a frequency-pass range for passing only the frequency range of said second color signal, means connected to apply the output of said second adding means to said second low-pass filter means, means inverting the phase of said brightness signal before it is added in said first and second adding means, third adding means connected to add the output signals of said first and second low-pass filters, and further adding means connected to add said brightness signal with the output signals of each of said first and second low-pass filter means and said third adding means to provide first, second and third image signals.

8. The circuit of claim 7, in which said fourth adding means comprises a cathode-ray tube having a control grid and a plurality of cathodes, means applying said brightness signal to said control grid and means applying said first, second and third image signals to separate cathodes.

9. A circuit for deriving image signals in a color television receiver adapted to receive color television signals containing image information in the form of a first video signal of relatively large bandwidth having lower frequency components representing a first color and higher frequency components representing brightness, and having alternately occurring second and third video signals of relatively small bandwidth representing second and third colors respectively, said circuit comprising a source of said first, second and third video signals, first adding means connected to add said first, second and third signals, means connected to invert the phase of said first signal before it is added in said first adding means, low-pass filter means having a frequency range for passing the frequency range of only said second and third signals, means connected to apply the added signals to said low-pass filter means, second adding means connected to add the output signal of said low-pass filter means with said first signal, and switching means connected to the output of said second adding means for separating the alternately occurring second and third signals.

10. The circuit of claim 9, comprising additional signal adding means having an input circuit connected to the output of said switching means, and a signal delay device connected between the output of said switching means and an input circuit of said additional signal adding means.

11. A circuit for deriving image signals in a color television receiver adapted to receive color television signals containing image information in the form of a first video signal of relatively large bandwidth having lower frequency components representing a first color and higher frequency components representing brightness, and having alternately occurring second and third video signals of relatively small bandwidth representing second and third colors respectively, said circuit comprising a source of said first, second and third video signals, switch means connected to separate said alternately occurring second and third video signals, first signal adding means having an input circuit connected to receive said separated second signal, first signal delay means connected to apply said separated second signal to the input circuit of said first adding means, second signal adding means connected to add the output signal of said first signal adding means with said first signal, first low-pass filter means having a frequency-pass range for passing the frequency range of said second signal, means connected to apply the output signal of said second adding means to said first filter means, third signal adding means connected to add the output signal of said first low-pass filter with said first signal to provide a first image signal, fourth signal adding means having an input circuit connected to receive said separated third signal, a second delay means connected to apply said separated third signal to the input circuit of said fourth adding means, fifth signal adding means connected to add the output signal of said fourth adding means with said first signal, second low-pass filter means having a frequency-pass range for passing the frequency range of said third signal, means connected to apply the output signal of said fifth adding means to said second filter means, sixth signal adding means connected to add the output signal of said second filter means with said first signal to provide a second image signal, and means inverting the phase of said first signal before it is added in each of said second and fifth adding means.

References Cited in the file of this patent

UNITED STATES PATENTS 2,927,151 Loughren ______________ Mar. 1, 1960

OTHER REFERENCES

Design Techniques for Color Television Receivers, Electronics, February 1954, pages 136 to 143.